United States Patent
Nyberg

(10) Patent No.: US 7,607,012 B2
(45) Date of Patent: Oct. 20, 2009

(54) METHOD FOR SECURING A COMMUNICATION

(75) Inventor: Kaisa Nyberg, Helsinki (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 10/677,642

(22) Filed: Oct. 1, 2003

(65) Prior Publication Data

US 2005/0076216 A1 Apr. 7, 2005

(51) Int. Cl.
*H04L 9/32* (2006.01)
*H04K 1/00* (2006.01)

(52) U.S. Cl. .................. 713/168; 713/150; 713/169; 380/33; 709/227

(58) Field of Classification Search ............ 380/33; 713/168–169
See application file for complete search history.

(56) References Cited

U.S. PATENT DOCUMENTS

| | | | |
|---|---|---|---|
| 5,159,632 A * | 10/1992 | Crandall | 380/28 |
| 5,450,493 A | 9/1995 | Maher | |
| 5,953,420 A * | 9/1999 | Matyas et al. | 713/171 |
| 7,284,127 B2 * | 10/2007 | Gehrmann | 713/169 |
| 2002/0087865 A1 * | 7/2002 | Eskicioglu | 713/180 |
| 2002/0186846 A1 | 12/2002 | Nyberg et al. | |
| 2004/0158715 A1 * | 8/2004 | Peyravian et al. | 713/171 |

OTHER PUBLICATIONS

C. Kaufman et al., "Internet Key Exchange (IKEv2) Protocol," IEFT Draft, Aug. 16, 2003, 99pp.
S. Sovio et al., "Final Technical Report—Specification of a Security Architecture for Distributed Terminals," Nov. 15, 2002, IST-2000-25350—Shaman, 158pp.
"Information Technology—Security Techniques—Entity Authentication—Part 6: Mechanisms Based on Manual Data Transfer," ISO/IEC JTC 1/SC 27 N XXXX, WD 9798-6, Apr. 27, 2003, 16pp.
C. Gehrmann et al., "Enhancements to Bluetooth Baseband Security," 15pp.
C. Gehrmann et al., "Bluetooth Security Expert Group Improved Pairing Proposal," Rev. 1.0, 14pp.
H. Tschofenig et al., "EAP IKEv2 Method," IEFT Draft, Jun. 2003, 12pp.
D. Balfanz et al., "Talking to Strangers: Authentication in Ad-Hoc Wireless Networks."

* cited by examiner

*Primary Examiner*—Ponnoreay Pich
(74) *Attorney, Agent, or Firm*—Alfred A. Fressola; Ware, Fressola, Van Der Sluys & Adolphson LLP

(57) ABSTRACT

A method for securing a communication between at least one initiator (I) and one responder (R) generates a first key (KEr) within the responder (R), generates a second key (K) within the responder (R), computes an authentication code (C) using the first key (KEr) and the second key within said responder (R), transmits the second key (K) and the authentication code (C) from the responder (R) to the initiator (I) using a first communication channel, transmits the first key (KEr) from the responder (R) to the initiator (I) using a second communication channel, computes a verification code (C') using the first key (KEr) and the second key (K) within the initiator (I), and compares the verification code (C') with the authentication code (C) within the initiator.

32 Claims, 5 Drawing Sheets

METHOD FOR SECURING A COMMUNICATION

TECHNICAL FIELD

The current invention relates to a method for securing a communication between at least one initiator and one responder of said communication. The invention also relates to a method for securing a communication between at least one initiator and one responder of said communication using legacy authentication. The invention also relates to a system for encrypting messages transmitted between an initiator and a responder. The invention further relates to a computer program, and a computer program product with instructions operable to cause a processor to secure a communication between at least one initiator and one responder of said communication. The invention also relates to communication devices for communicating securely with an initiator and modules for communication between communication devices.

BACKGROUND OF THE INVENTION

In current communication, it is important to secure the communicated messages. As there are many possibilities for interception, eavesdropping and tampering, the communicated messages should be secured against fraud.

A known approach for securing communication is the internet protocol security (IPsec). The IPsec provides confidentiality, data integrity, access control, and data source authentication of datagrams being sent over various communication channels. These services are provided by maintaining shared secrets between the source and the sink of an IP-datagram. The states define, among other things, the specific services provided to the datagrams. This may be which cryptographic algorithms will be use to provide the services as well as the key used as input to the cryptographic algorithms. The internet key exchange (IKE) allows mutual authentication and establishment of shared secrets between two parties.

Therefore, it is proposed to use shared secret information and a set of cryptographic algorithms to be used. All communication via this protocol consists of pairs of messages. These pairs comprise a request and a response.

When establishing an IKE communication, at first IKE_SA_INIT messages are exchanged and thereafter IKE_AUTH messages are exchanged between an initiator and a responder. In most cases only two IKE_SA_INIT messages and two IKE_AUTH messages are exchanged to establish secure communication.

The IKEv2-protocol is described in detail in C. Kaufmann: "Internet key exchange (IKEv2) protocol", IETF IPsec working group, draft-ietf-ipsec-IKEv2-10.txt, Aug. 16, 2003.

During initiation of the communication, security parameters are negotiated between initiator and responder, e.g. nonces (one-time random numbers), parameters and Diffie-Hellman values are exchanged within IKE_SA_INIT messages. After that in IKE_AUTH messages identities and proves of knowledge of the secrets corresponding to the two identities (initiator, responder) are transmitted.

In the current versions of the internet key exchange protocol, the parties communicate and authenticate each other using public key certificates or strong shared secret keys. However, such messages are not applicable to situation where a constrained key management channel is used. This is the case in a personal area network, where the user wants to initialise an ad-hoc security association between two devices by making the devices share a short secret password.

For user authentication in IKEv2 the shared keys should be a strong shared secret key. In case the shared keys are derived solely from a user, communication might be insecure. User passwords are typically insecure, because they are unlikely to have sufficient unpredictability to resist dictionary attacks.

Therefore, communication using IKEv2 protocols without strong shared secrets might be insecure. Authentication between initiator and responder as well as confidentiality and integrity of the messages to be sent, might be subject to fraud.

SUMMARY OF THE INVENTION

To provide an easy to use, secure way of communicating via a protocol for secure communication of peer devices, where no previous security relationship or online trusted third party can be used, comprises: computing an authentication code using a first key and a second key within said responder, transmitting said second key and said authentication code from said responder to said initiator using a first communication channel, transmitting said first key from said responder to said initiator using a second communication channel, computing a verification code using said first key and said second key within said initiator, and comparing said verification code with said authentication code within said initiator.

By transmitting said second key and said authentication code from said responder to said initiator via a first communication channel and transmitting said first key from said responder to said initiator using a second communication channel, the second key may be a short secret key. With the short secret key together with the first key, it is possible to authenticate the responder within the initiator and to secure the communication. Using manual authentication methods for computing the verification code and the authentication code, initial authentication may be achieved.

Transmitting the authentication code and the second key using a first communication channel may be understood as pre-authentication. By using this pre-authentication, no changes are required to standard protocols, like IKEv2.

A shared secret key SK which is used for ciphering and authorising messages according to IKEv2 may be derived from a Diffie-Hellman value, which is computed using a first key KEr from the responder and a first key KEi from the initiator. Said second key K may be weak, but the ciphering as proposed with the shared secret key is strong. Said second key may be a short and weak key. It must not be a long hash code.

Performing initial pre-authentication prior to exchanging protocol messages, and performing a verification step after receiving a protocol message, allows establishing a strong encryption and authentication of the messages to be sent.

The protocol steps constitute a manual authentication protocol MANA, which makes use of a confidential and authenticated communication channel. This channel is separate from the communication channel, over which the protocol messages are communicated.

Said first communication channel can be realised for example over infrared, radio frequency RF, audio, video, human communication or other interfaces. The first communication channel is in particular a proximity-based, narrow band communication channel. Such a location-limited channel should have two properties. First, it should support demonstrative identification; that is, identification based on physical context. Communication technologies that have inherent physical limitations in their transmissions are good candidates. The second property of the location-limited channel should be authenticity, which means that it is impossible or difficult for an attacker to transmit in that channel, or at least to transmit without being detected by the legitimate participants.

The second communication channel may be any wireless or wired communication channel, which might be insecure in terms of eavesdropping and/or tampering of the communication.

To compute and compare the authentication and verification codes, the initiator and responder need to share an algorithm to compute and verify short message authentication codes, such as the ones based on the Reed-Solomon codes. Such functionality may be a message authentication code (MAC) function or a hash function.

To prevent said second key and said authentication code from eavesdropping and tampering, it is proposed that these are transmitted via a confidential and/or authenticated communication channel such as the first communication channel.

As the second key is already transmitted via a secure channel, it is possible to transmit said first key via an open communication channel, and the receiver can verify the authenticity of the first key.

To attain said first and/or said second key, it is proposed that these keys are generated within the responder.

To make pre-authentication secure, it is proposed that said authentication code and said verification code are computed using an algorithm to compute a short message authentication code (MAC).

To allow communication even if a first transmission of the first key is disturbed, it is proposed that when the comparison of authentication code and verification code yields a difference, said initiator requests said responder to retransmit said first key.

To allow authentication of the initiator to the responder, and vice versa, in a secure manner, even if a short shared secret is used, it is proposed that an authentication value is calculated within said initiator using said second key. Since the first key was authenticated, the encrypted authentication value can be securely transmitted from the initiator to the responder.

The authentication may be considered strong, as said first key may be authenticated using said second key, said first key may be used to calculate a shared secret key, and an authentication value may be encrypted using such a shared secret key, such as SKe and authenticated using SKa according to IKEv2.

It is further proposed that said authentication value is calculated using a pseudo random function (prf) as defined by IKEv2.

To authenticate messages transmitted from initiator to responder, it is proposed that said authentication value is used for authenticating messages transmitted from said initiator to said responder, and vice versa. In case a standard protocol, such as IKEv2, is used, the steps of computing an authentication code using a first key and a second key within said responder, and transmitting said second key and said authentication code from said responder to said initiator using a first communication channel may be understood as pre-authentication messages and steps of transmitting said first key from said responder to said initiator using a second communication channel and using said authentication value for authenticating messages transmitted from said initiator to said responder, or vice versa, may be understood as internet key exchange protocol messages.

Another aspect of the invention is a method for securing a communication between at least one initiator and one responder of said communication using legacy authentication comprising: computing an authentication code using a raw public key and a second key within said responder, transmitting said second key and said authentication code from said responder to said initiator using a first communication channel, transmitting said raw public key from said responder to said initiator within an encrypted certification payload using a second communication channel, extracting said raw public key from said encrypted certification payload, computing a verification code using said raw public key and said second key within said initiator, and comparing said verification code with said authentication code within said initiator.

In particular within the IKEv2 protocol, extended authentication protocol for client authentication is proposed. Within this protocol, an authentication field in a message of the responder to the initiator is computed. This field may use "Rives, Shamir, Adleman" (RSA) signatures, which the authentication of the responder is based on. According to the invention, a raw public key might be used as RSA key.

To authenticate the responder to the initiator it becomes possible that within the certification payload the raw public key of the responder is comprised and within the initiator it may be checked whether said raw public key corresponds to the second key and the authentication code previously transmitted. If this is the case, the responder may be authenticated by the initiator as being the correct communication partner.

When using the Extensible Authentication Protocol (EAP) method of the IKEv2 protocol, the EAP messages may be authenticated using said second key.

It is further possible that the pre-authentication exchange is split into two parts, where the first part is the secret initiator password, and the second part is an unkeyed long hash-code, computed over the responders Diffie-Hellman token, or over the raw public key. Then the initiator's password is communicated over a confidential and authenticated channel, while the hash-code needs only to be transmitted authenticated, without confidentiality. It is therefore proposed, that said second key comprises two parts, from which a first part is used for computing an authentication code C and a second part is used for calculating an authentication value (AUTH). The value of the second key used in pre-authentication may be the same as used for calculation an authentication value (AUTH), but may also be different for pre-authentication and calculation of said authentication value (AUTH).

To allow secure communication of said second key, it is proposed that said second key and said authentication code are transmitted via a confidential and/or authentic communication channel.

According to the IKEv2 protocol, it is proposed that the encrypted certification payload comprising said raw public key is transmitted via an open communication channel.

To allow verification and authentication of the transmitted messages, it is proposed that said authentication code and said verification code are computed using an algorithm to compute a short message authentication code.

In case transmission is disturbed, a retransmission is allowed when the comparison of authentication code and verification code yields differences, and said initiator requests said responder to retransmit said certification payload.

In further communication, like EAP protocol messages, the EAP messages may be authenticated using the second key.

It is further proposed, that the steps computing an authentication code using a raw public key and a second key within said responder, and transmitting said second key and said authentication code from said responder to said initiator using a first communication channel are pre-authentication messages and that transmitting said raw public key from said responder to said initiator within an encrypted certification payload using a second communication channel is an internet key exchange protocol with extended authentication protocol message.

Another aspect of the invention is a system for encrypting messages transmitted between an initiator and a responder, wherein said responder comprises computing means for computing an authentication code from a first key and a second key, first transmission means for transmitting said second key and said authentication code from said responder to said initiator using a first communication channel, and second transmission means for transmitting said first key from said responder to said initiator using a second communication channel, said initiator comprises first transmission means for receiving said second key and said authentication code from said responder via said first communication channel, second transmission means for receiving said first key from said responder via a second communication channel, computing means to compute a verification code from said first key and said second key, and comparing means to compare said verification code with said authentication code.

To secure the communication of said second key and said authentication code, said first transmission means of said responder and said initiator allow communicating via a confidential and/or authenticated communication channel. In this case the first key transmitted via a second transmission means may be authenticated using the second key. Then, in IKEv2 for instance, the first key may be used to compute a shared secret key, for instance a Diffie-Hellman key, by which the authentication value may be encrypted.

It is proposed that said second transmission means of said responder and said initiator allow communicating via an open communication channel.

To allow sending said second key after it has been computed in the responder, it is proposed that said responder comprises storage means to store said second key.

To allow computation of a verification code and comparison between an authentication code and said verification code, it is proposed that said initiator comprises storage means to store said received second key and said received authentication code.

To allow communicating using a standard internet protocol, such as IKEv2, it is proposed that said initiator and said responder comprise operating means to be operated according to an internet key exchange protocol, such as IKEv2.

Another aspect of the invention is a computer program and a computer program product with instructions operable to cause a processor to secure a communication between at least one initiator and one responder of said communication by computing an authentication code using a first key and a second key within said responder, transmitting said second key and said authentication code from said responder to said initiator using a first communication channel, transmitting said first key from said responder to said initiator using a second communication channel, computing a verification code using said first key and said second key within said initiator, and comparing said verification code with said authentication code within said initiator.

Yet another aspect of the invention is a communication device for communicating securely with an initiator, said device comprising computing means for computing an authentication code from a first key and a second key, first transmission means for transmitting said second key and said authentication code from said responder to said initiator using a first communication channel, and second transmission means for transmitting said first key from said responder to said initiator using a second communication channel, deciphering means, deciphering a ciphered message from said initiator, where said ciphered message is ciphered with a shared secret key at least partially derived from said first key.

To allow secure communication, it is proposed that said communication device comprises authorising means, authorising an authorisation message from said initiator, where said authorisation message is authorised with a shared secret key at least partially derived from said first key.

Yet a further aspect of the invention is a communication device for communicating securely with a responder, said device comprising first transmission means for receiving a second key and an authentication code from a responder via said first communication channel, second transmission means for receiving a first key from said responder via a second communication channel, computing means to compute a verification code from said first key and said second key, and comparing means for comparing said verification code with said authentication code, and ciphering means, ciphering a message to be sent to said responder, where said ciphered message is ciphered with a shared secret key at least partially derived from said first key.

A further aspect of the invention is a module for providing secure communication with a communication device, said module comprising computing means for computing an authentication code from said first key and said second key, first transmission means for transmitting said second key and said authentication code from said responder to said initiator using a first communication channel, and second transmission means for transmitting said first key from said responder to said initiator using a second communication channel, deciphering means, deciphering a ciphered message from said initiator, where said ciphered message is ciphered with a shared secret key at least partially derived from said first key.

Yet another aspect of the invention is a module for providing secure communication with a communication device, said module comprising first transmission means for receiving a second key and an authentication code from a responder via said first communication channel, second transmission means for receiving a first key from said responder via a second communication channel, computing means to compute a verification code from said first key and said second key, and comparing means for comparing said verification code with said authentication code ciphering means, ciphering a message to be sent to said responder, where said ciphered message is ciphered with a shared secret key at least partially derived from said first key.

These and other aspects of the invention will be apparent from and elucidated with references to the following figures. In the figures show:

DETAILED DESCRIPTION OF THE INVENTION

IP Security (IPsec) provides confidentiality, data integrity, access control, and data source authentication to Internet Protocol (IP) datagrams. These services are provided by maintaining shared states between the source and the sink of an IP datagram. The states define, among other things, the specific services provided to the datagram, which cryptographic algorithms will be used to provide the services, and the keys used as input to the cryptographic algorithms.

A protocol to establish the states dynamically is needed. Such a protocol may be the Internet Key Exchange (IKE) protocol. IKE performs mutual authentication between two parties and establishes an IKE security association that includes shared secret information.

Figure 1:
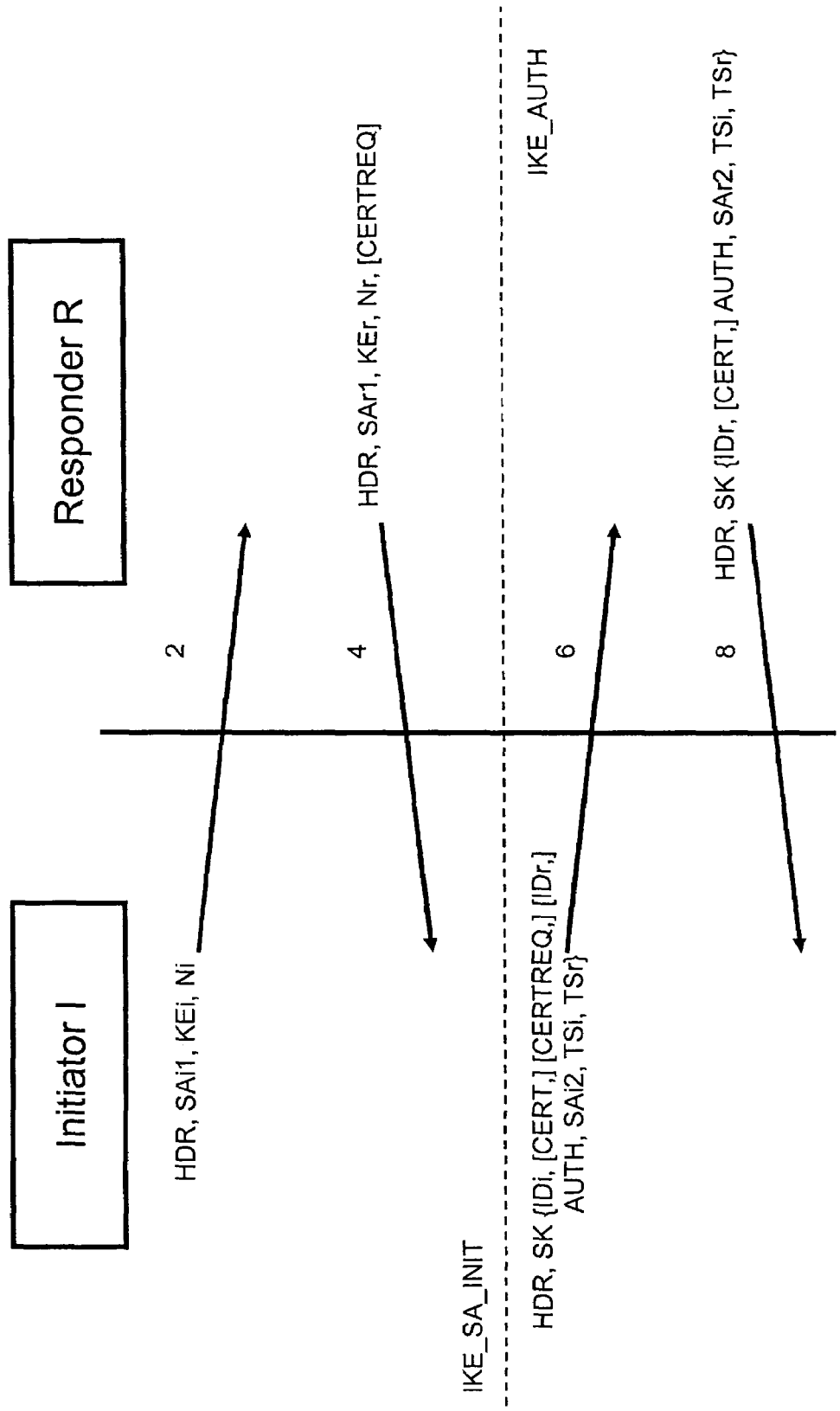
FIG. 1 messages transmitted using basic IKEv2 key exchanged.

FIG. 1 depicts first messages establishing a communication initialisation IKE_SA_INIT and communication authentication IKE_AUTH.

To establish an internet key exchange communication, there is a single IKE_SA_INIT exchange and a single IKE_AUTH exchange (a total of four messages 2-8). To provide secure communication, all IKE_SA_INIT exchanges should be complete before any other exchange type, then all IKE_AUTH exchanges should be completed prior to any other communication.

IKE message flows always consists of a request followed by a response. It is the responsibility of the requester to ensure reliability. If the response is not received within a timeout interval, the requester needs to retransmit the request (or abandon the connection).

As depicted in FIG. 1, communication using IKE may begin with IKE_SA_INIT and IKE_AUTH exchanges. These initial exchanges may consist of four messages 2-8.

The first pair of messages 2, 4 negotiates cryptographic algorithms, exchange nonces, and do a Diffie-Hellman exchange.

The second pair of messages 6, 8 authenticates the previous messages, exchanges identities and certificates, and establishes further communication. Parts of these messages are encrypted and integrity protected with keys established through the message 2, 4, so the identities are hidden from eavesdroppers and all fields in all the messages are authenticated.

The payloads contained in the message 2-8 are indicated by names. Payloads appearing optionally are shown in brackets, such as [CERTREQ]. This indicates that a certificate request payload can be included optionally.

In message 2, the data HDR, SAi, KEi, and Ni, are transmitted from initiator I to responder R. The IP header HDR contains information such as version numbers, and flags of various sorts. The identifier of the security association payload SAi1 states the cryptographic algorithms the initiator I supports. The KE payload sends the Diffie-Hellman value of the initiator. Ni is the nonce (a one-time random number) of the initiator.

Responding to message 2, the responder R sends message 4 to initiator I. The responder R chooses a cryptographic suite from the choices offered by the initiator and expresses that choice in the SAr1 payload. The responder further completes the Diffie-Hellman exchange with the KEr payload, and sends its nonce in the Nr payload.

The IKE_SA_INIT messages 2, 4 each contain a nonce N. These nonces N are used as inputs to cryptographic functions, may add freshness to the key derivation technique used to obtain keys, and may also extract strong pseudo-random bits from the Diffie-Hellman key.

For communicating messages according to IKEv2, cryptographic algorithms such as an encryption algorithm, an integrity protection algorithm, a Diffie-Hellman group, and a pseudo-random function (prf) are used. The pseudo-random function may be used for the construction of keying material.

The prf function may take a variable length key, variable length data, and may then produce a fixed length output (e.g., when using Keyed-Hashing for Message Authentication HMAC). When the key for the prf function has a fixed length, the data provided as a key may be truncated or padded with zeros as necessary.

Keying material will always be derived as the output of the negotiated prf algorithm. Since the amount of keying material needed may be greater than the size of the output of the prf algorithm, the prf algorithm may be used iteratively.

At this point in the negotiation each party can generate SKEYSEED, from which all keys are derived for that following communication. All but the headers of all the messages that follow messages 2, 4 are encrypted and integrity protected.

The keys used for the encryption and integrity protection are derived and are known as SK_e (encryption) and SK_a (authentication). A separate SK_e and SK_a is computed for each direction.

The notation SK { ... } in the messages 6, 8 indicates that their payloads are encrypted and integrity protected using direction SK_e and SK_a, respectively. SK is the shared secret key, which may be a result of the Diffie-Hellman key exchange. SK { ... } results in encrypting the payload within the brackets using the key SK.

After the IKE_SA_INIT messages 2, 4 are exchanged the initiator I asserts his identity with the IDi payload, proves knowledge of the secret corresponding to IDi, and integrity protects the contents of the messages 6, 8 using the AUTH payload. The initiator I may also send his certificate in a CERT payload and a list of his trust anchors in CERTREQ payload(s). The optional payload IDr enables the initiator I to specify which of the responder R identities he wants to talk to. This is useful when the responder R is hosting multiple identities at the same IP address. All other payload is described in the IKEv2 protocol.

Upon reception of the message 6, the responder R asserts his identity with the IDr payload, optionally sends one or more certificates (again with the certificate containing the public key used to verify AUTH listed first), authenticates his identity with the AUTH payload, and completes negotiation with the additional fields in message 8.

When not using extended authentication, the communication peers (initiator I and receiver R), are authenticated by having each sign (or MAC using a shared secret as the key) the data being transmitted. For the responder R, the octets to be signed start with the first octet of the header of the message 8 and end with the last octet of the last payload in the message 8.

Similarly, the initiator I signs the message 6, starting with the first octet of the header and ending with the last octet of the last payload. It is critical to the security of the exchange that each side sign the other side's nonce.

Optionally, messages 6 and 8 might include a certificate, or certificate chains providing evidence that the key used to compute a digital signature belongs to the name in the ID payload. The signature or MAC will be computed using algorithms dictated by the type of key used by the signer, and specified by the AUTH method field in the authentication payload.

The pre-shared key should contain as much unpredictability as the strongest key being negotiated. Therefore, it is proposed to relax this requirement by adding a pre-authentication step. In the case of a pre-shared key, the AUTH value is computed as:

AUTH=prf(prf(Shared Secret, "Key Pad for IKEv2"),
    <message octets>)

where the string "Key Pad for IKEv2" is ASCII encoded and not null terminated. The shared secret can be of variable length. The pad string is added so that if the shared secret is derived from a password, the IKE implementation needs not to store the password in clear text, but may rather store the value prf(Shared Secret,"Key Pad for IKEv2"), which could not be used as a password equivalent for protocols other than IKEv2

Deriving the shared secret from a user chosen password may not be secure. It is a common but typically insecure practice to have a shared key derived solely from a user chosen password without incorporating another source of randomness. This is typically insecure because user chosen passwords are unlikely to have sufficient unpredictability to resist dictionary attacks and these attacks are not prevented in this authentication method.

The invention therefore proposes to use a pre-authentication method, where a password is communicated between responder R and initiator I which comprises enough randomness to secure communication and not allowing dictionary attacks. Further the inventive method allows to be incorporated into existing protocols, such as IKE, without the need to change these protocols.

Figure 2:
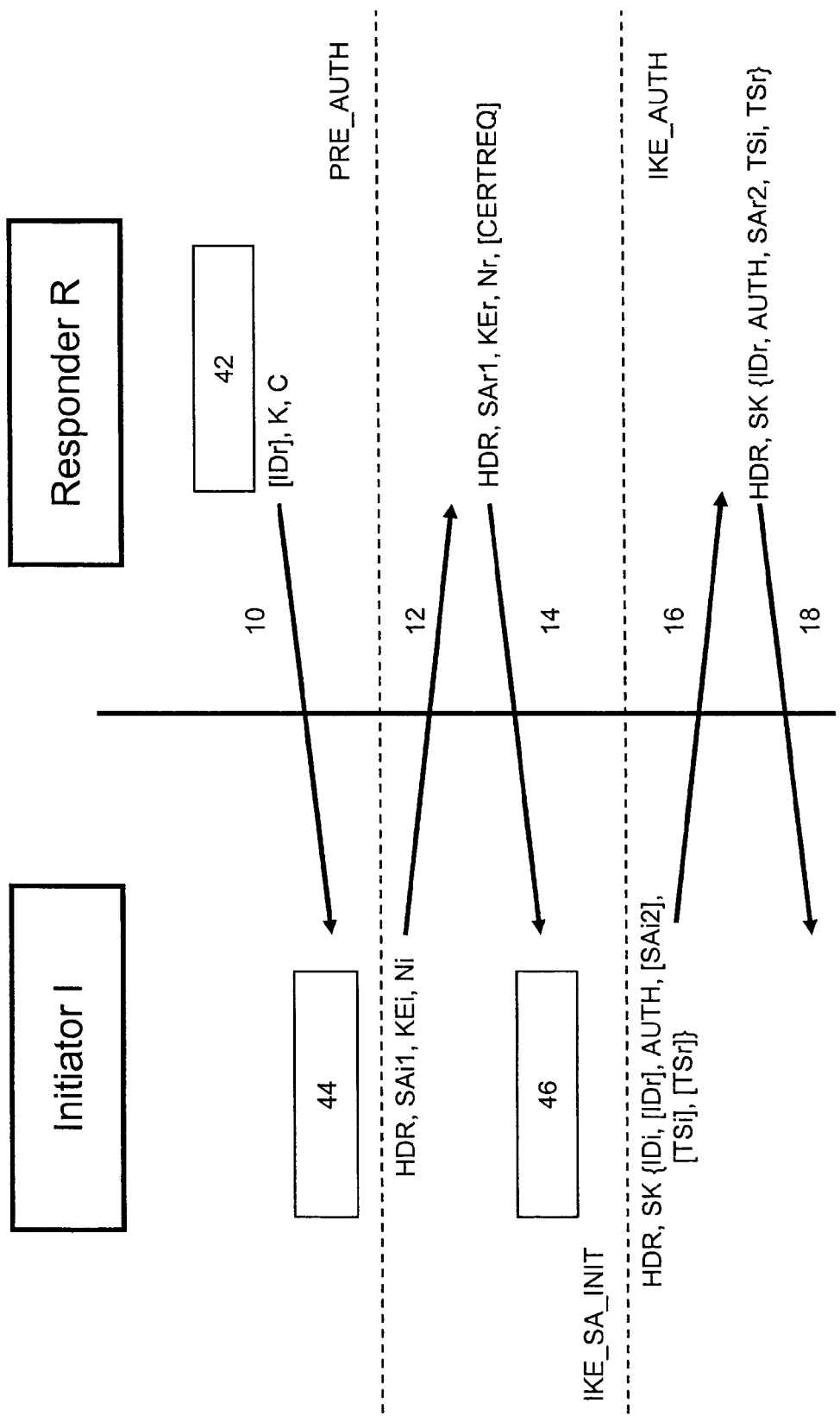
FIG. 2 messages sent between initiator and responder using the inventive method.

As can be seen from FIG. 2, prior to messages 12-18, which in general relate to messages 2-8, a message 10 will be transmitted, transporting a shared key over a secure communication channel, such as a proximity-based channel, where eavesdropping is almost not possible. Such a channel may be an infrared channel.

In step 42 the responder R generates a Diffie-Hellman exchange token KEr, a short shared secret K, and computes an authentication code C using a MAC function MAC(K, KEr). The short shared secret K is stored within responder R. In message 10 the responder R transmits its ID IDr, the shared secret K and the authentication code C. The transmission is done via a secure communication channel. In step 44, the initiator I stores the received ID IDr, the shared secret K and the authentication code C.

In the following, the IKE_SA_INIT message 12, 14 are transmitted, as already described in FIG. 1. Only the CERTREQ field in message 14 is not used.

After reception of the message 14, the initiator I knows the Diffie-Hellman Exchange token KEr from the responder R. The initiator I retrieves in step 46 the saved short shared secret K and the authentication code C. The initiator I computes a verification code C' using MAC(K, KEr). If the stored authentication code C and the computed verification code C' are equal, the initiator I accepts the message 14 and performs the remaining steps of the IKE protocol.

The AUTH value for the messages 16 and 18 are calculated by

AUTH=prf(prf(Shared Secret, "Key Pad for IKEv2"),
    <message octets>)

In the inventive method, the shared secret key SK may be calculated from the short shared secret K. The message octets may be as specified in the IKEv2 Protocol containing the information from the previous message of the sender.

Figure 3:
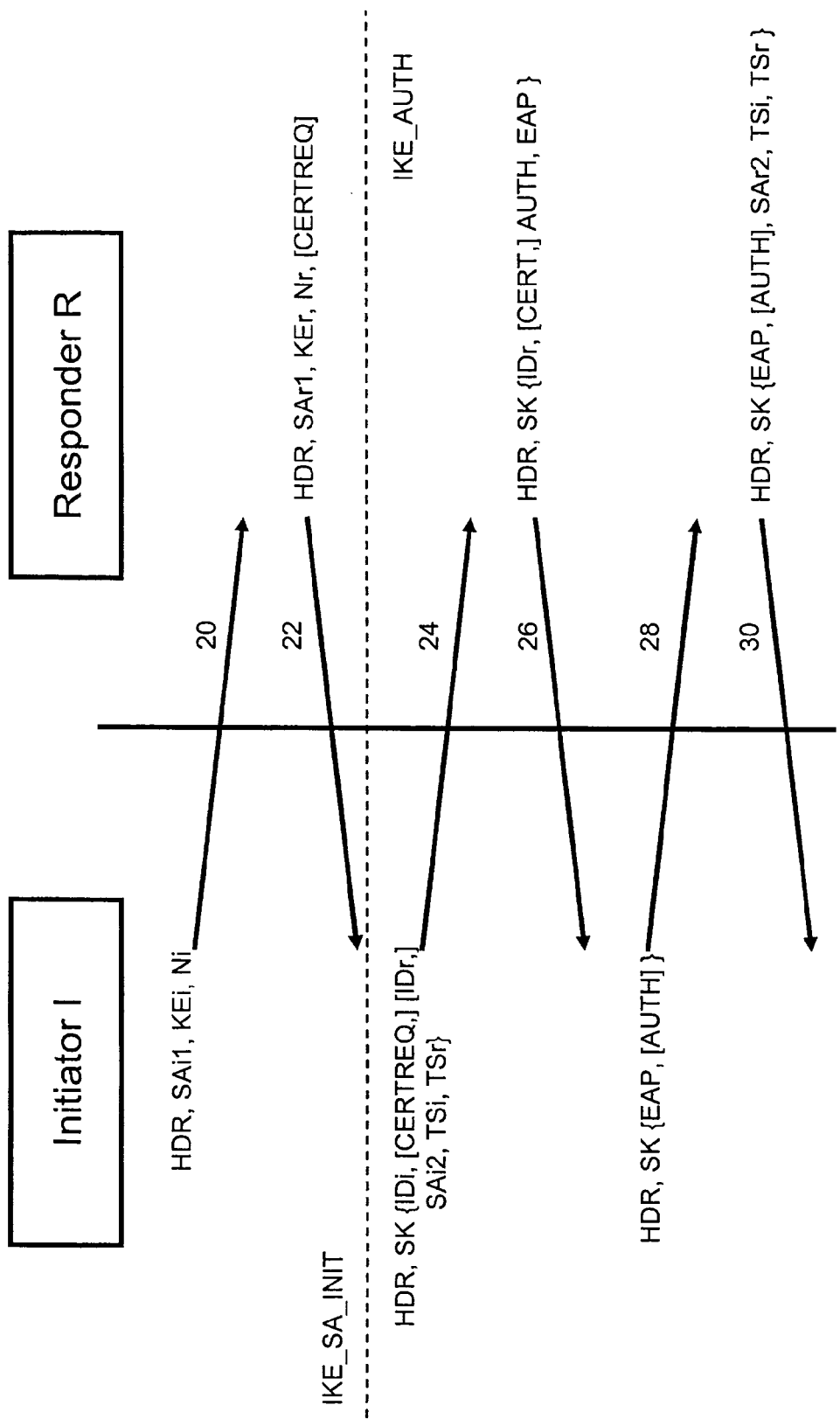
FIG. 3 messages transmitted between initiator and responder using IKEv2 with legacy authentication.

FIG. 3 depicts an extended authentication protocol method according to IKEv2.

Typically, this method is asymmetric and therefore may not be mutual. For this reason, this protocol is typically used to authenticate the initiator I to the responder R and may be used in addition to a public key signature based authentication of the responder R to the initiator I. The shown method may also be referred to as "Legacy Authentication" mechanism.

The extended authentication protocol EAP defines an authentication protocol requiring a variable number of messages. Extended Authentication is implemented in IKE as additional IKE_AUTH exchanges that should be completed in order to initialise the communication according to this protocol.

The IKE_SA_INIT messages as described in FIG. 1, messages 2, 4, are as well transmitted in the method according to FIG. 3, in messages 20, 22.

After IKE_SA_INIT, in IKE_AUTH messages 24-30, as depicted in FIG. 3, an initiator I indicates a desire to use extended authentication by leaving out the AUTH payload from message 24. This is the difference to message 6 according to FIG. 1.

After reception of message 24, the responder R transmits message 26, and includes an IDi payload but not an AUTH payload, the initiator I has declared an identity but has not proven it. If the responder R is willing to use an extended authentication method, it will place an EAP payload in message 26 and defer sending SAr2, traffic selectors TSi, and TSr until initiator I authentication is complete in a subsequent IKE_AUTH exchange.

For EAP methods that create a shared key as a side effect of authentication, that shared key should be used by both the initiator I and responder R to generate an AUTH payload using the syntax for shared secrets.

The AUTH payload in message 26 is computed using RSA signatures, on which the authentication of the responder R is based on. The EAP method used to authenticate the initiator I can be any client authentication method using a short password. To secure the short key for legacy authentication, a pre-authentication via a secure communication channel differing from the main communication channel is proposed by the invention and depicted in FIG. 4.

Figure 4:
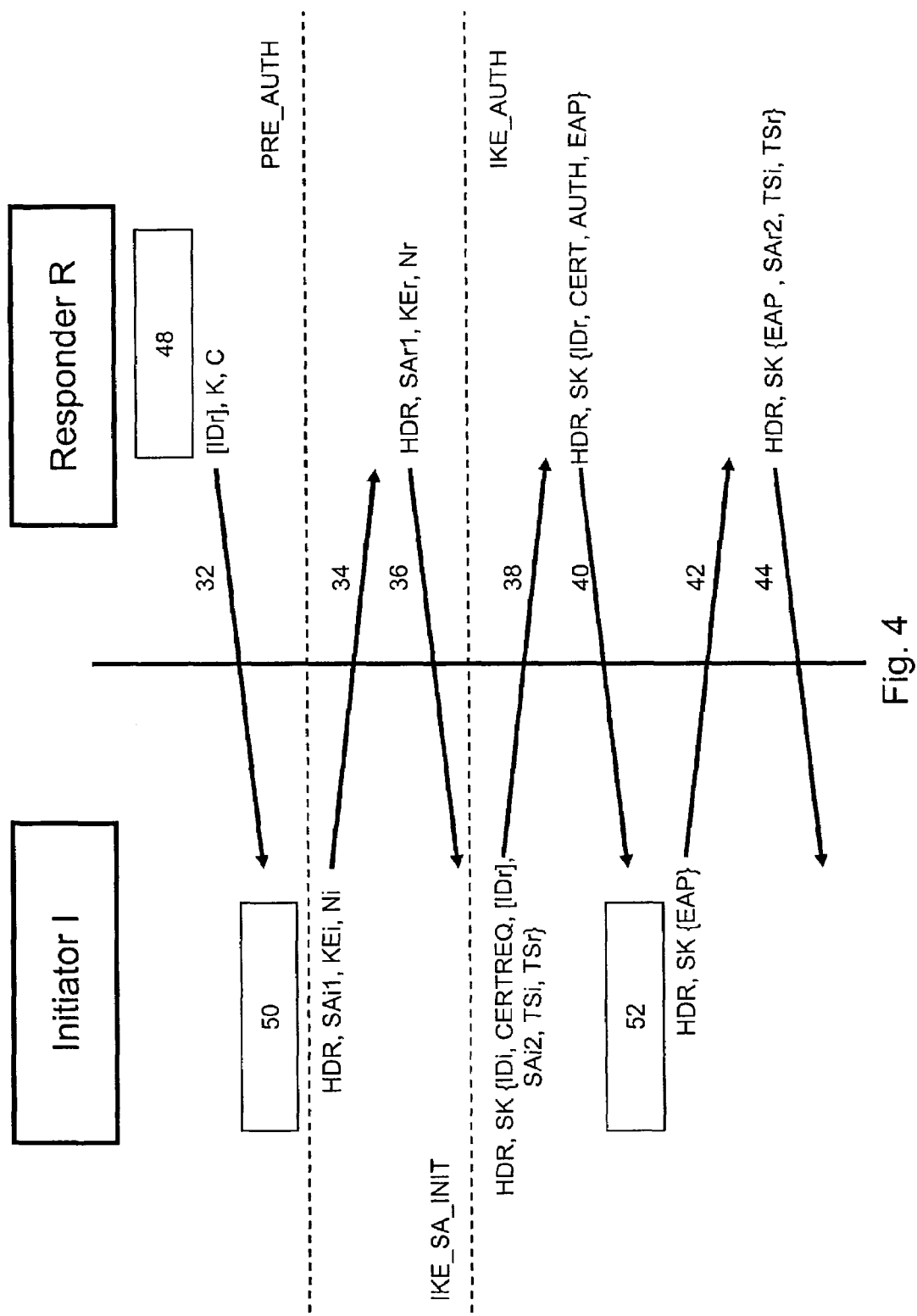
FIG. 4 messages transmitted between initiator and responder using an inventive authentication.

As depicted in FIG. 4, the IKE_SA_INIT messages 34, 36 correspond to the IKE_SA_INIT messages of FIGS. 1 and 3.

Prior to IKE_SA_INIT, in step 48 the responder R generates a raw RSA key PKr, a short shared secret K, and computes an authentication code C by MAC (K, PKr). Further, the responder R saves the short shared secret K.

In message 32, the responder R transmits via a proximity channel said short shared secret K and said authentication code C. The responder R may also transmit its ID IDr. In step 50 the initiator I saves the received short shared secret K, authentication code C, and responder R ID IDr. Messages 34, 36, 38 correspond to messages 20, 22, 24 of FIG. 3.

In message 40 the responder R transmits within the CERT payload its raw RSA key PKr. In step 52 the initiator I receives this CERT payload and retrieves the stored short shared secret K, and authentication code C. Moreover, the initiator I extracts the raw RSA key PKr from the encrypted public key certificate CERT payload and computes a verification code C' by MAC (K, PKr). If C=C', the initiator I accepts the received PKr as correct and performs the remaining steps. If C is not equal to C', the initiator I may retransmit the IKE_SA_INIT requests a small number of times.

For further communication, messages 42, 44 the initiator I and responder R may be authenticated using the short shared secret K.

Figure 5:
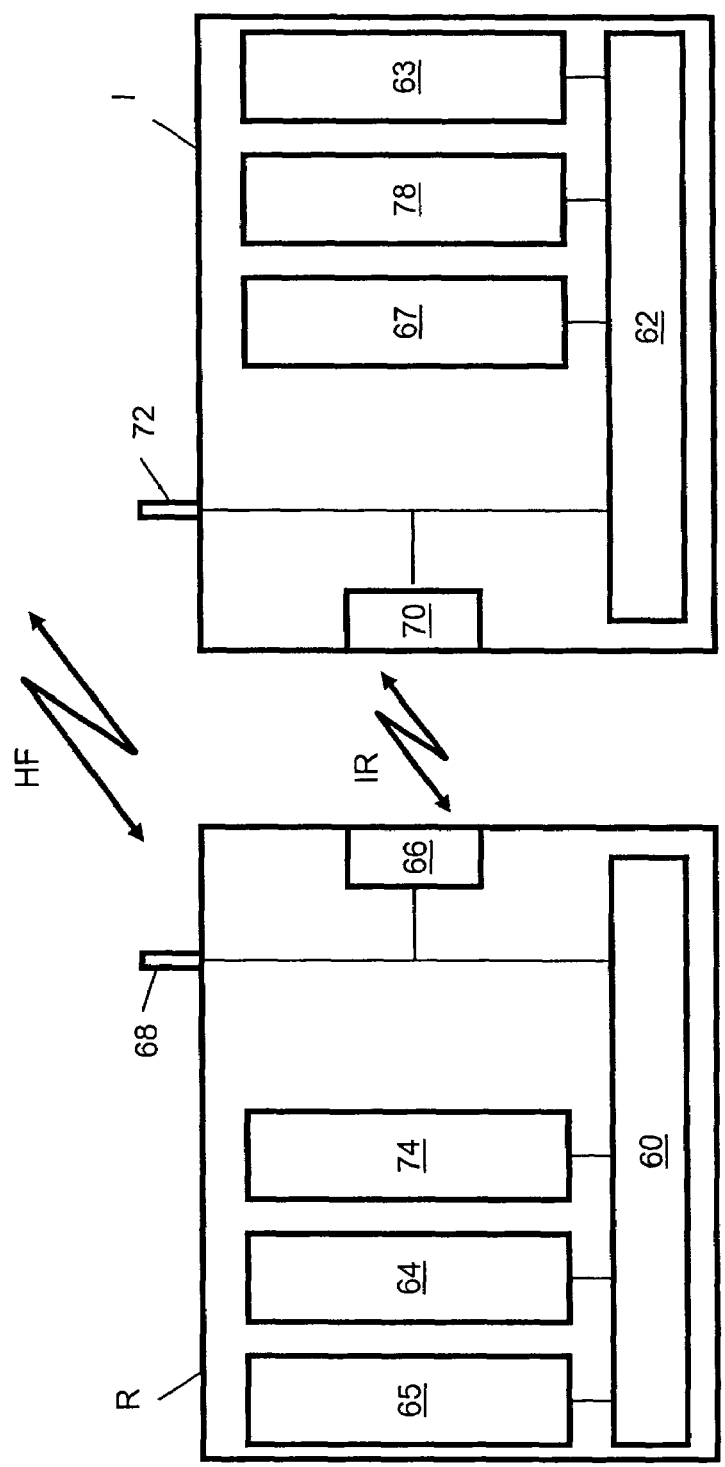
FIG. 5 a system according to the invention.

FIG. 5 depicts an inventive system. Depicted are a responder R and an initiator I, communication over a first communication channel IR, for instance infrared, and a second communication channel HF, for instance high frequency. Said responder R and said initiator I both comprise operation means 60, 62, such as microcomputers or digital signal processors.

Said responder R further comprises generating means 64 for generation of a first key KEr and a second key K, computing means 65 for computing and authentication code C from said first key KEr and said second key K, first transmission means 66, like an infrared sensor, for transmitting said second key K and said authentication code C from said responder R to said initiator I using said first communication channel IR, second transmission means 68, like a high frequency antenna, or a microwave antenna, for transmitting said first key KEr from said responder R to said initiator I using said second communication channel HF.

Said initiator I further comprises first transmission means 70, for receiving said second key K and said authentication code C from said responder R via said first communication channel IR, second transmission means 72 for receiving said first key KEr from said responder R via a second communication channel HF, computing means 63 to compute a verification code C' from said first key KEr and said second key K, and comparing means 67 to compare said verification code C' with said authentication code C.

Further, said responder R comprises storage means 74 to store said second key and said initiator I comprises storage means 78 to store said received second key and said received authentication code C.

Said operating means 60, 62 are connected to said computing means 65, 63, said generating means 64, said comparing means 67, said transmission means 66, 68, 70, 72, and said storage means 74, 78. The operating means 60, 62 allow operating said responder R and said initiator I according to an internet key exchange protocol, such as IKEv2.

What is claimed is:

1. A method comprising:
   computing an authentication code using a first key and a second key within a responder,
   transmitting both said second key and said authentication code from said responder to an initiator using a first communication channel, after computing said authentication code,
   transmitting said first key from said responder to said initiator using a second communication channel,
   computing a verification code using said first key and said second key within said initiator,
   comparing said verification code with said authentication code within said initiator, and
   authenticating said responder as a correct communication partner if said comparing checks out,
   wherein said second key is a secret key and said first communication channel is a secure channel.

2. The method of claim 1, wherein the first key is generated within said responder.

3. The method of claim 1, wherein the second key is generated within said responder.

4. The method of claim 1, wherein in the transmitting of said second key and said authentication code, said second key and said authentication code are transmitted via a confidential or authenticated communication channel or both.

5. The method of claim 1, wherein in the transmitting of said first key, said first key is transmitted via an open communication channel.

6. The method of claim 1, wherein said second key is composed of a first part and a second part and wherein said first part is used for computing said authentication code and said second part is used for calculating an authentication value.

7. The method of claim 6, wherein said first part is an empty string and wherein said authentication code is calculated as an unkeyed hash code.

8. The method of claim 1, wherein said authentication code and said verification code are computed using an algorithm to compute a short message authentication code.

9. The method of claim 1, wherein if the comparison of authentication code and verification code yields a difference, said initiator requests said responder to retransmit said first key.

10. The method of claim 1 further comprising calculating an authentication value within said initiator using said second key.

11. The method of claim 10, wherein said authentication code is calculated using a pseudo random function.

12. The method of claim 10, further comprising using said authentication value for authenticating messages that have been transmitted from said initiator to said responder, or vice versa.

13. The method of claim 12, wherein the computing of an authentication code and the transmitting of said second key and said authentication code are utilize pre-authentication messages, and wherein the transmitting of said first key and the using of said authentication value utilize internet key exchange protocol messages.

14. The method of claim 1, wherein said computing the authentication code and said computing the verification code both use a message authentication code function of only two variables, said two variables being the first key and the second key.

15. A method comprising:
   computing an authentication code using a raw public key and a second key within a responder,
   transmitting both said second key and said authentication code from said responder to an initiator using a first communication channel, after computing said authentication code,
   transmitting said raw public key from responder to said initiator within an encrypted certification payload using a second communication channel,
   extracting said raw public key from said encrypted certification payload,
   computing a verification code using said raw public key and said second key within said initiator,
   comparing said verification code with said authentication code within said initiator, and
   authenticating said responder as a correct communication partner if said comparing checks out,
   wherein said second key is a secret key and said first communication channel is a secure channel.

16. The method of claim 15, wherein said raw public key is generated within said responder.

17. The method of claim 15, wherein the second key is generated within said responder.

18. The method of claim 15, wherein the transmitting of said second key and said authentication code, said second key and said authentication code are transmitted via a confidential or authenticated communication channel or both.

19. The method of claim 15, wherein said second key is composed of a first part and a second part and wherein said first part is used for computing said authentication code and said second part is used for calculating an authentication value.

20. The method of claim 15, wherein said first part is an empty string and wherein said authentication code is calculated as an unkeyed hash code.

21. The method of claim 15, wherein in the transmitting of said raw public key, said encrypted certification payload comprising said raw public key is transmitted via an open communication channel.

22. The method of claim 15, wherein said authentication code and said verification code are computed using an algorithm to compute a short message authentication code.

23. The method of claim 15, wherein if the comparison of the authentication code and the verification code yields a difference, said initiator requests said responder to retransmit said certification payload.

24. The method of claim 15, wherein in further steps for communicating the second key is used for authenticating the initiator to the responder.

25. The method of claim 15, wherein the computing of an authentication code and the transmitting of said second key and said authentication code utilize pre-authentication messages and wherein the transmitting of said raw public key is utilizes an internet key exchange protocol with extended authentication protocol message.

26. A system comprising an initiator and a responder, wherein said responder comprises computing means configured to compute an authentication code from a first key and a second key, first transmission means configured to transmit both said second key and said authentication code from said responder to said initiator using a first communication channel, after computing said authentication code, and second transmission means configured to transmit said first key from said responder to said initiator using a second communication channel, and wherein said initiator comprises first transmission means configured to receive said second key and said authentication code from said responder via said first communication channel, second transmission means configured to receive said first key from said responder via said second communication channel, computing means configured to compute a verification code from said first key and said second key, and comparing means configured to compare said verification code with said authentication code wherein said second key is a secret key and said first communication channel is a secure channel.

27. The system of claim 26, wherein said responder further comprises generating means for generating the first key or the second key or both.

28. The system of claim 26, wherein said first transmission means of said responder and said initiator allow communicating via a confidential or authenticated communication channel or both.

29. The system of claim 26, wherein said second transmission means of said responder and said initiator allow communicating via an open communication channel.

30. The system of claim 26, wherein said initiator and said responder comprise operating means to be operated according to an internet key exchange protocol.

31. A computer readable medium stored with instructions operable to cause a processor to secure a communication between an initiator and a responder of said communication by:

computing an authentication code using a first key and a second key within said responder, transmitting both said second key and said authentication code from said responder to said initiator using a first communication channel, after computing said authentication code, transmitting said first key from said responder to said initiator using a second communication channel, computing a verification code using said first key and said second key within said initiator, and comparing said verification code with said authentication code within said initiator, wherein said second key is a secret key and said first communication channel is a secure channel.

32. The computer readable medium of claim 31, wherein the communication is also secured by said initiator requesting said responder to retransmit said first key if the comparison of authentication code and verification code yields a difference.

* * * * *

UNITED STATES PATENT AND TRADEMARK OFFICE
CERTIFICATE OF CORRECTION

PATENT NO. : 7,607,012 B2
APPLICATION NO. : 10/677642
DATED : October 20, 2009
INVENTOR(S) : Kaisa Nyberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Twelfth Day of October, 2010

David J. Kappos
*Director of the United States Patent and Trademark Office*